S. RISLEY.
WEIGHING DEVICE.
APPLICATION FILED FEB. 15, 1915.

1,185,827.

Patented June 6, 1916.

Witnesses:
A. L. Lord.
C. A. Shotzberger

Inventor.
Sheridan Risley
by B. W. Brockett
Att'y.

UNITED STATES PATENT OFFICE.

SHERIDAN RISLEY, OF CLEVELAND, OHIO, ASSIGNOR TO THE CLEVELAND DENTAL MANUFACTURING COMPANY, OF CLEVELAND, OHIO, A CORPORATION OF OHIO.

WEIGHING DEVICE.

1,185,827.  Specification of Letters Patent.  Patented June 6, 1916.

Application filed February 15, 1915. Serial No. 8,232.

*To all whom it may concern:*

Be it known that I, SHERIDAN RISLEY, a citizen of the United States, residing at Cleveland, in the county of Cuyahoga and State of Ohio, have invented certain new and useful Improvements in Weighing Devices, of which the following is a specification.

This invention relates generally to weighing devices and particularly to that class utilized in weighing small quantities of material.

More specifically the invention relates to a balance comprising a sheet metal stamped base having secured to the upper surface thereof a bracket comprising two arms, each of which is provided with a V-shaped recess, the two recesses being adapted to receive a pivot pin secured to a stamped metal beam comprising a receptacle at one end and graduated portions at the other end, each of said portions being embraced by a sliding weight having an index point coöperating with the graduations.

The invention may be further briefly summarized as consisting in the construction and combination of parts hereinafter set forth in the following description, drawings and claim.

Figure 1:
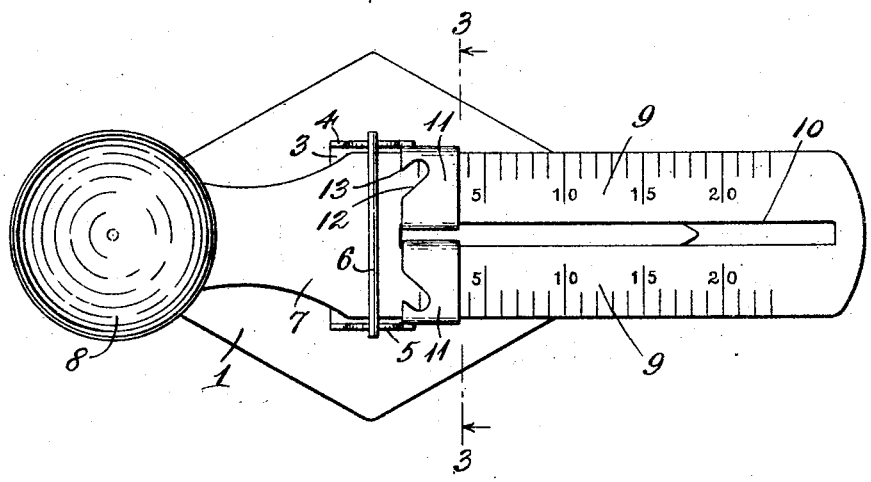
Figure 2:
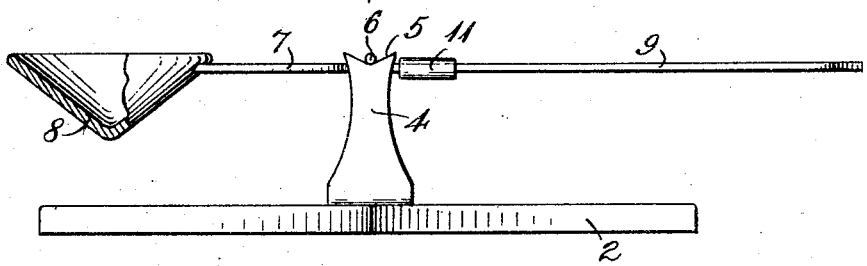
Figure 3:
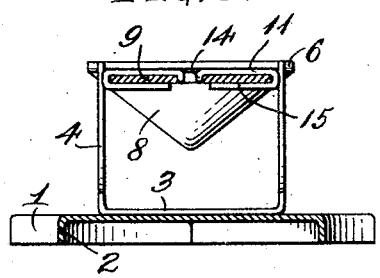

Referring to the drawings, Figure 1 is a top plan view of the device; Fig. 2 is a side elevation; and Fig. 3 is a section upon the line 3—3 of Fig. 1 looking to the left.

In carrying out the invention any preferred form and construction of parts may be employed so long as they possess the necessary characteristics, and I have shown one arrangement which is effective, and in such embodiment 1 represents a diamond-shaped base formed of sheet metal with a depending peripheral flange 2 which gives rigidity to the base. Secured upon the base at substantially the symmetrical center is a U-shaped bracket 3 having upwardly extending side portions 4, each of which has a V-shaped recess 5 at its upper end. Engaging in these recesses is a pivot pin 6 secured to the beam 7, which is provided at one end with a suitable receptacle or pan 8 on one side of the pivot and a pair of graduated beam portions 9 on the opposite side of the pivot. The entire beam is preferably formed of sheet metal and the graduated beam portions are formed by providing the beam with a slot 10. Engaging around each beam portion 9 is a weight of sheet metal comprising a main portion 11 provided with a recess 12 forming an index point 13 at one edge for coöperation with the corresponding graduations, a downwardly extending flange 14 for engagement with one of the edges of the slot 10, and an under portion 15 bent around and extending under the beam portion to hold the weight in place.

It will be seen from the foregoing description that the two weights may be utilized in weighing without the employment of a heavy weight as would be the case where one weight were used with a single beam.

Having described my invention, I claim:—

A balance, a base, a U-shaped bracket secured to said base and having V-shaped recesses in the upper free ends of the side portions of the U, a beam structure comprising a pivot engaging in said recesses, a stamped metal beam having a receptacle at one end and spaced graduated beam portions at the opposite end, and suitable sheet metal weights folded around each beam portion, each of said weights being provided with an index point.

In testimony whereof I affix my signature in presence of two witnesses as follows.

SHERIDAN RISLEY.

Witnesses:
G. O. FARQUHARSON,
C. H. SHOTZBARGER.

Copies of this patent may be obtained for five cents each, by addressing the "Commissioner of Patents, Washington, D. C."